Sept. 25, 1928.

F. H. McCORMICK

WATER HEATER

Filed Dec. 13, 1926

1,685,642

Inventor:
Francis H. McCormick,
by
His Attorney.

Patented Sept. 25, 1928.

1,685,642

UNITED STATES PATENT OFFICE.

FRANCIS H. McCORMICK, OF GLEN ELLYN, ILLINOIS, ASSIGNOR TO EDISON ELECTRIC APPLIANCE COMPANY, INC., OF CHICAGO, ILLINOIS, A CORPORATION OF NEW YORK.

WATER HEATER.

Application filed December 13, 1926. Serial No. 154,375.

My invention relates to water heaters of the storage type, and the like, and has for its object the provision of means whereby a small quantity of hot water is made available in the storage tank in a relatively short time.

In carrying out my invention in one form I provide a water duct which communicates at its ends with top and bottom regions of the tank, and associated with which is suitable heating means together with temperature-responsive means for regulating the thermal flow of water through the duct so that when the water in the tank is cold the flow of water through the duct is greatly restricted and as a result this small quantity of water is heated to a relatively high temperature. As the temperature of the water in the tank increases the temperature-responsive means operate to provide greater freedom of flow. I also provide thermostatic means for shutting off the supply of heat when the entire contents of the tank has been heated.

Figure 1:
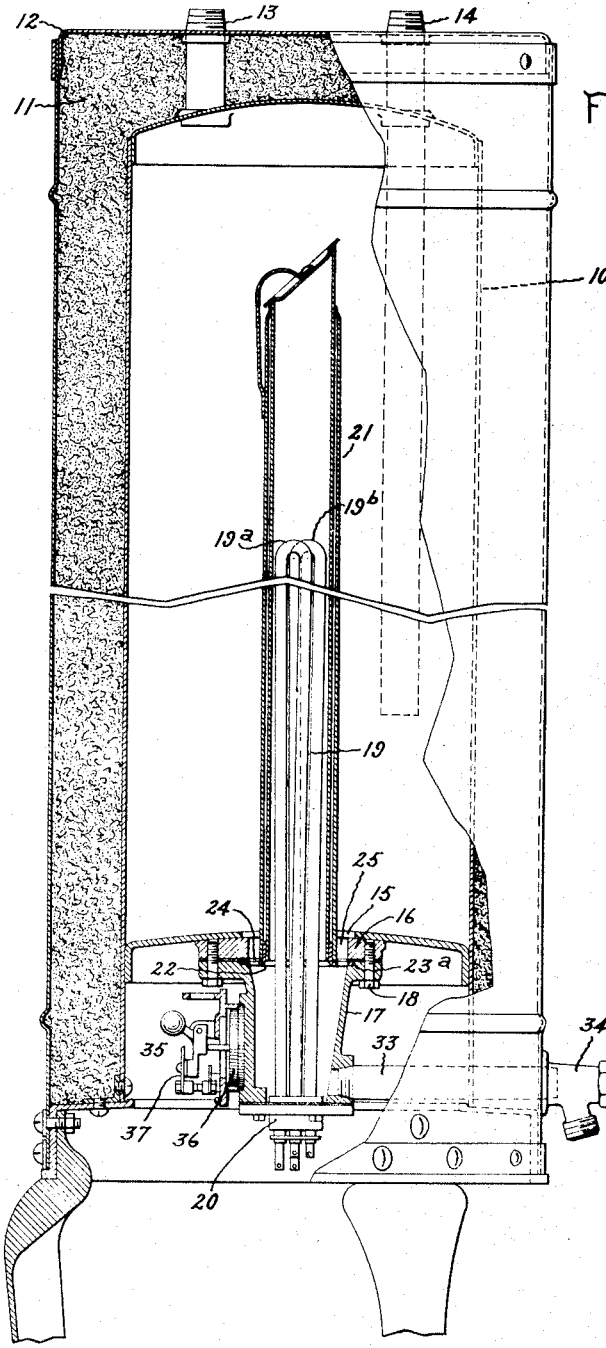
Figure 2:
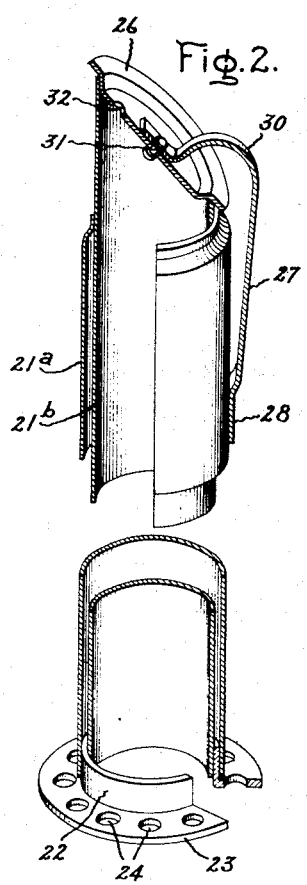

For a more complete understanding of my invention, reference should be had to the accompanying drawing in which Fig. 1 is an elevation view mainly in section of a water heater embodying my invention while Fig. 2 is an enlarged view partly in section showing details of construction.

Referring to the drawing, my invention in one form comprises a suitable water storage tank 10 which is surrounded at the top and sides with suitable heat insulating material 11, such as rock wool, this material being placed between the tank and an outer enclosing casing 12. A discharge pipe 13 for the hot water is provided at the top of the tank and also an inlet pipe 14 for the cold water. This inlet pipe 14, however, extends downward into the interior of the tank so as to communicate with the colder water in the lower regions, it being understood that any hot water, being of lower density, will immediately rise to the top where it can be withdrawn through the pipe 13. The pipe 14 extends downward to within a few inches of the bottom of the tank. In the bottom of the tank is an opening 15 through which suitable heating means for the tank is inserted. A flange 16 is secured to the bottom of the tank on the exterior side thereof, and the heating means is secured to a receptacle like supporting member 17 which is secured to the flange 16, as shown by bolts 18. A suitable gasket is placed between the member 17 and the flange 16 to assure a water-tight joint.

The heater 19 comprises lengths of sheathed resistance heating units of suitable type, such for example as shown in Patent No. 1,367,341 to Abbott, dated February 1, 1921. As shown, two lengths $19^a$ and $19^b$ of sheathed heating units are provided, these lengths being bent at substantially the middle in the form of hairpins and having their ends secured to and passing through a metallic cap member 20. It will be understood that the heating units are enclosed in metallic sheaths made of suitable material, for example copper, and at the point where the units pass through the cap 20, soldered, brazed or welded joints are made between the sheath and the cap so that a water-tight connection is formed with the cap. The cap is in turn secured by suitable bolts to the lower open end of the receptacle member 17 so that the heating unit 19 extends upward in a substantially vertical direction through the receptacle member 17 and the opening 15 into the tank. A water-tight joint is provided between the cap 20 and the member 17.

Surrounding the heater 19 is a double walled tube or casing 21 which forms a duct extending centrally of the tank. This duct is preferably provided with double walls $21^a$ and $21^b$ spaced slightly apart to provide a dead air space between them for heat insulation. As shown in Fig. 2, the two walls are spaced at the bottom by a collar 22 to which the walls are secured, for example, by soldering or brazing. The collar 22 is provided with a flange 23 and this flange is clamped between the receptacle member 17 and the flange 16 on the bottom of the tank as shown in Fig. 1, whereby the casing is secured in place. As shown the receptacle member 17 is countersunk at $23^a$ to receive the flange 23. A plurality of apertures 24 are provided in the flange 23, and the aperture 15, the flange 16 and the receptacle 17 are considerably larger than the outer dimension of the casing whereby a space 25 is formed around the casing through which water from the bottom of the tank is free to flow downward and through the apertures 24 to the bottom of the casing where it comes in contact with the heater 19 and passes upward through the casing. The upper end of the casing 21 terminates in a suitable upper region of the tank.

The upper end of the casing is provided with a flapper valve 26 whereby the thermal flow of water upward through the duct can be controlled. As shown, the upper end of the casing is formed at an angle with the axis of the duct, and on the shortest or lowest side of the casing is secured a temperature-responsive device, shown as bimetallic thermostatic strip 27. This strip has its lower end secured to the casing at point 28, while its upper end is formed with a curved portion 30 extending over the adjacent edge of the casing to the center of the duct where a riveted connection 31 is provided between its end and the center of the flapper valve 26. A relatively small opening 32 is provided in the flapper valve on the uppermost, i. e. highest, size thereof through which a restricted flow of water may take place when the valve is closed, as it normally is by spring tension of the thermostat when the water in the tank is cold.

An outlet pipe 33 terminating in a valve 34 is provided at the bottom of the receptacle 17 through which the tank may be drained. Secured to one side of the receptacle 17 is a temperature-responsive cut-out 35 which operates to open the circuit of the heater 19 when the water in the tank has been heated to a predetermined temperature and to reclose it when the water has cooled to a somewhat lower temperature. This cut-out device may be of any suitable construction, but it is preferably as shown in Patent No. 1,456,087 to Charles C. Abbott, dated May 22, 1923, and comprises a receptacle 36 filled with a suitable gas and provided with a diaphragm which is forced toward the left by expansion of the gas, and upon the occurrence of the predetermined temperature operates a switch arm 37 to open the heating circuit. This cut-out being located at the lowermost point of the tank, in fact on the receptacle 17, which is still lower than the bottom of the tank is responsive to the temperature of the coldest water at the bottom of the tank so that it does not operate to open the heating circuit until the entire body of water has been heated.

In the operation of the device, assuming that the tank is filled with cold water and the circuit of the heater 19 has been closed, the small quantity of water in the casing 21 will be immediately heated and by reason of the restricted thermal flow through the orifice 32 this water will be heated to a desired high temperature even though the water in the tank itself is cold. Comparatively little loss of heat occurs through the wall of the casing by reason of the heat insulation provided by the air space between its double walls. This small amount of hot water escapes through the orifice 32 and immediately rises to the top of the tank where it can be drawn off through the discharge pipe 13. A small quantity of hot water thus becomes available very quickly. As the hot water accumulates in the top of the tank the temperature of the water increases in the vicinity of the thermostat 27 and the thermostat in responding tends to bend away from the casing whereby the valve 26 is gradually opened to permit an increased flow of water. The valve is gradually opened as the temperature increases thus permitting a greater rapidity of flow, the arrangement of the thermostat and valve being such that the water escaping from the duct is heated to a predetermined high temperature. In other words, the water flowing upward through the duct is always heated to a desired high temperature regardless of whether the surrounding water in the tank is hot or cold. When the heater is shut off and the water begins to cool or the tank is replenished with cold water, the thermostat operates to close the flapper valve so that when the heater is again connected hot water will be available in a short time.

The results obtained by means of the thermostatically operated valve 26 may perhaps be best understood by considering the operation of a heater in which no thermostatically operated valve is provided. With no valve provided, the flow of water through the duct 21 would either be entirely free, the duct having a uniform cross sectional area throughout, or the flow of water would be permanently restricted by providing a relatively small water passage in the duct circuit. Assuming that the flow is free with a duct of uniform cross sectional area, in this case the temperature of the water in the tank would be quite uniform as it is heated, the water in the top of the tank being only slightly higher in temperature than the water in the bottom. This arrangement has the obvious disadvantage that hot water is not immediately available. With the duct provided with a fixed restricted passageway, for example, assume that the top of the duct is closed with the exception of an outlet orifice 32, this being the condition actually existing at the beginning of the heating operation when the tank is full of cold water. This, as previously pointed out, provides for the accumulation in a very short period of time of a small quantity of hot water in the top of the tank, but with the outlet permanently restricted the temperature of the water in the top of the tank would gradually increase as the heating operation proceeded so that by the time the water at the bottom of the tank had been heated to the predetermined temperature at which the thermostatic cut-out 35 would open the supply circuit, the water at the top of the tank would be heated to an excessively high temperature. In other words, with a permanently restricted outlet opening the temperature of the water is always increased a predetermined amount in passing through the duct which means that as the temperature of the water entering the duct is increased, the temperature of the water leaving the duct is correspondingly increased.

The thermostatic valve gives the desirable operating characteristics of both of the conditions previously mentioned, that is, a restricted opening at the beginning of the heating operation and complete freedom of flow at the end of the heating operation so when the heater is disconnected by the cut-out 35 the water in the tank is heated to a uniform temperature throughout. Furthermore, the valve 26 is opened by the thermostat as the heating operation proceeds so that there is comparatively little increase in the temperature of the water at the top of the tank while the remainder of the water is being heated. This is due to the fact that the water leaving the duct is heated to a predetermined desired temperature regardless of its temperature upon entering the duct, and as the temperature of the water entering the duct increases the valve opening increases so that greater freedom of flow is permitted.

With a typical water heater outfit, I found that with unrestricted flow the temperature of the water at the top of the tank was only approximately 22° F. higher than at the bottom. With a permanently restricted opening the water at the top was heated to approximately 140° F. before the water in the bottom of the tank was heated to any appreciable extent, but by the time the water in the bottom had been heated to 125° F., at which temperature the thermostat relay 35 opened the circuit, the water at the top had reached the excessive temperature of approximately 195° F.

Tests carried out with a heater equipped in accordance with my invention, starting with the tank full of cold water at approximately 65° F., showed an increase in temperature of the water at the top of the tank to approximately 143° F. without appreciable increase at the bottom of the tank, and the temperature at the top showed a further increase of only 7° F. while the remaining water was being heated and the temperature at the bottom increased to 125° F., at which temperature the relay 35 disconnected the heater.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the annexed claims.

What I claim as new and desire to secure by Letters Patent of the United States, is:—

1. A water heater comprising a tank, heating means for said tank, and temperature responsive means for controlling said heating means so as to heat a relatively small quantity of water in the top of the tank to a predetermined high temperature and thereafter heat the water in the lower regions of said tank without substantial increase in the temperature of the water at the top of the tank.

2. A water heater comprising a tank, heating means for said tank, and means responsive to the temperature of the water in an upper region of said tank for controlling said heating means so as to heat a relatively small quantity of water in the upper region of the tank to a predetermined temperature at which said temperature responsive means operates to regulate said heating means and thereafter heat the water in the lower regions of said tank.

3. A water heater comprising a tank, heating means for said tank, and temperature responsive means for controlling said heating means so as to heat a relatively small quantity of water in the top of the tank to a predetermined high temperature and thereafter heat the water in the lower regions of said tank without substantial increase in the temperature of the water at the top of the tank, and means responsive to the temperature of the water in the lower regions of said tank for shutting off said heating means.

4. A water heater comprising a tank, a duct communicating with the upper and lower regions of said tank, means for heating the water in said duct whereby a thermal flow of water is set up therethrough in an upward direction, and temperature responsive means for controlling the flow of water through said duct.

5. A water heater comprising a tank, a duct communicating with the upper and lower regions of said tank, means for heating the water in said duct, and temperature responsive means for regulating the thermal flow of water through said duct in accordance with the temperature of the water in said tank so as to cause the water to be heated to a predetermined temperature in passing through said duct.

6. A water heater comprising a tank, a duct communicating with the upper and lower regions of said tank, means for heating the water in said duct whereby a thermal flow of water is set up therethrough in an upward direction, and means responsive to the temperature of the water in an upper region of said tank for controlling the flow of water through said duct so as to produce a small quantity of hot water in the top of the tank without substantial increase in the temperature of the water in the lower regions of said tank, and thereafter heat the water in the lower regions of said tank without substantial increase in the temperature of the water in the top of the tank.

7. A water heater comprising a tank, a duct communicating with the upper and lower regions of said tank, means for heating the water in said duct whereby a thermal flow of water is set up therethrough in an upward direction, and means responsive to the temperature of the water in an upper region of said tank for regulating the flow of water through said duct so as to maintain the water in the top of the tank at substantially a predetermined maximum temperature while the water in the lower regions of said tank is being heated, and a temperature controlled cutout for said heater responsive to the temperature of the water in a lower region of said tank.

8. A water heater comprising a tank provided with a discharge opening at the top, a duct communicating with the tank at the top and bottom thereof, means for heating the water in said duct whereby an upward thermal flow of water is set up through said duct, and temperature responsive means for restricting the flow of water through said duct so as to cause the water to be heated to a relatively high temperature in passing through said duct whereby hot water is accumulated rapidly in the top of said tank.

9. A water heater comprising a tank provided with a discharge opening at the top, an upright duct in said tank communicating with said tank at the top and bottom thereof, means for heating the water in said duct, a valve in said duct, and means responsive to the temperature of the water in the tank for operating said valve so as to substantially shut off the flow of water when the water in the tank is at a relatively low temperature and gradually opening said valve to permit an increased rate of flow as the temperature of the water rises whereby the water is heated in said duct to a predetermined high temperature irrespective of the temperature of the water in the tank and hot water thereby caused to accumulate rapidly in the top of the tank.

10. A water heater comprising a tank, a duct communicating with the upper and lower regions of said tank, means for heating the water in said duct whereby a thermal flow of water is set up therethrough in an upward direction, a valve in said duct, and means responsive to the temperature of the water in an upper region of said tank for operating said valve to restrict the flow of water at the beginning of the heating operation, whereby hot water is caused to accumulate quickly in the top of the tank, and for gradually opening said valve to heat the water in the lower regions of said tank without substantial increase in the temperature of the water in the top of the tank.

11. A water heater comprising a tank, a duct communicating with the upper and lower regions of said tank, electric heating means for the water in said duct whereby a thermal flow of water is set up therethrough in an upward direction, a valve in said duct, means responsive to the temperature of the water in an upper region of said tank for operating said valve to restrict the flow of water at the beginning of the heating operation, whereby hot water is caused to accumulate quickly in the top of the tank, and for gradually opening said valve to heat the water in the lower regions of the tank without substantial increase in the temperature of the water in the top of the tank, and means responsive to the temperature of the water in the bottom of the tank for shutting off said heater when the water has been heated to a predetermined temperature.

12. A water heater comprising a tank, a duct in said tank communicating with the upper and lower regions thereof, a heater in said duct, a valve at the upper end of said duct, and temperature responsive means for operating said valve.

13. A water heater comprising a tank, a duct communicating with the upper and lower regions of said tank, a heater in said duct, a valve in said duct, and a thermostat secured externally of said duct connected to operate said valve so as to control the thermal flow of water through said duct.

14. A water heater comprising a tank, an upright duct in said tank communicating with the bottom thereof and opening at its upper end in an upper region of said tank, an electric heater in said duct, a valve in the upper end of said duct, a thermostat in an upper region of said tank for operating said valve to give an initial restricted opening in said duct and gradually increasing said opening as the water in the lower region of said tank is heated, and a temperature cut-out for said heater responsive to the temperature of the water in the bottom of the tank.

In witness whereof, I have hereunto set my hand this 6th day of December, 1926.

FRANCIS H. McCORMICK.